United States Patent
Mueller

(10) Patent No.: US 9,416,864 B2
(45) Date of Patent: Aug. 16, 2016

(54) COUPLEABLE DRIVE

(76) Inventor: Peter A. Mueller, Gattikon (CH)

(*) Notice: Subject to any disclaimer, the term of this patent is extended or adjusted under 35 U.S.C. 154(b) by 510 days.

(21) Appl. No.: 13/695,873

(22) PCT Filed: May 2, 2011

(86) PCT No.: PCT/CH2011/000099
§ 371 (c)(1),
(2), (4) Date: Jan. 28, 2013

(87) PCT Pub. No.: WO2011/137549
PCT Pub. Date: Nov. 10, 2011

(65) Prior Publication Data
US 2013/0134009 A1 May 30, 2013

(30) Foreign Application Priority Data

May 3, 2010 (CH) .................................. 662/10

(51) Int. Cl.
*F16H 57/029* (2012.01)
*B25F 5/00* (2006.01)
*B25F 5/02* (2006.01)

(52) U.S. Cl.
CPC ............... *F16H 57/029* (2013.01); *B25F 5/00* (2013.01); *B25F 5/02* (2013.01)

(58) Field of Classification Search
CPC ... F16H 57/027; F16H 57/029; F16H 57/032; F16H 2057/0325; F16H 2057/02026; F16H 2057/02034; F16H 2057/02069; F16H 2057/02073; B25F 5/00; B25F 5/02; B25F 1/02
See application file for complete search history.

(56) References Cited

U.S. PATENT DOCUMENTS

| | | | |
|---|---|---|---|
| 5,447,078 A * | 9/1995 | Robinson et al. | 74/606 R |
| 5,720,206 A * | 2/1998 | Watanabe | F16H 57/027 74/606 R |
| 2003/0121676 A1 | 7/2003 | Ortt et al. | |
| 2006/0202571 A1 | 9/2006 | Wilkinson et al. | |
| 2008/0222871 A1 | 9/2008 | Wilkinson et al. | |
| 2013/0133512 A1* | 5/2013 | Mueller | 92/110 |
| 2013/0319152 A1* | 12/2013 | Bea | 74/421 A |

FOREIGN PATENT DOCUMENTS

| | | |
|---|---|---|
| EP | 1 323 501 A2 | 7/2003 |
| EP | 1 703 619 A1 | 9/2006 |
| EP | 1 832 392 A1 | 9/2007 |
| GB | 2462938 A | 3/2010 |

OTHER PUBLICATIONS

Sep. 6, 2011 International Search Report issued in International Patent Application No. PCT/Ch2011/000099.

* cited by examiner

*Primary Examiner* — Jacob S Scott
(74) *Attorney, Agent, or Firm* — Oliff PLC

(57) ABSTRACT

The invention relates to a basic drive (1), which, by means of few manual actions, can be coupled securely and with an exact fit to desired modules (2) one or more times by means of a quick-acting closure (8, 8a), and which has different technical functions, ranging from the lifting functions by means of a spindle lift module (16), gas spring (60), electromagnetic locking mechanism (27), turning module (38), controller (14) and sensor module (54), through to the basic drive (1), to which a solar cell enclosure (42) may be attached.

15 Claims, 3 Drawing Sheets

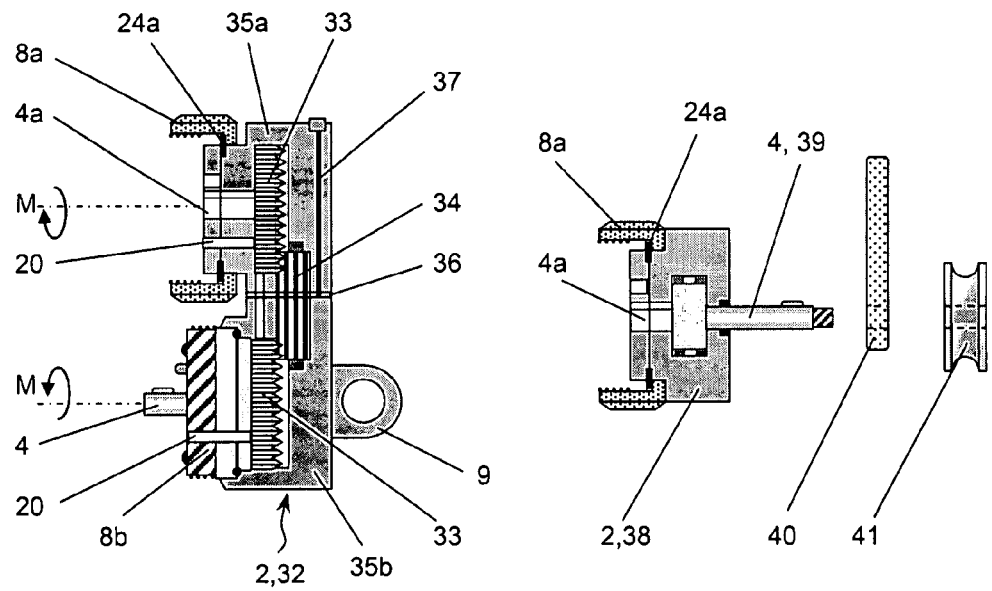
Fig 5                    Fig 6
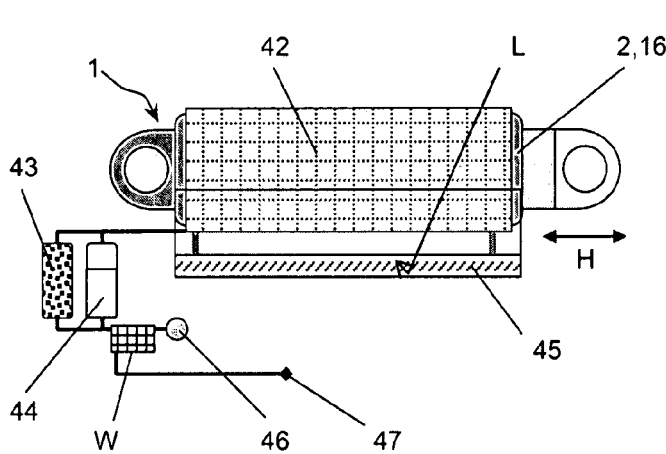 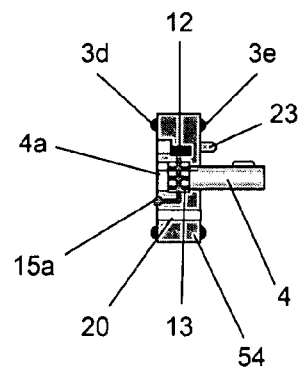
Fig 7                    Fig 8
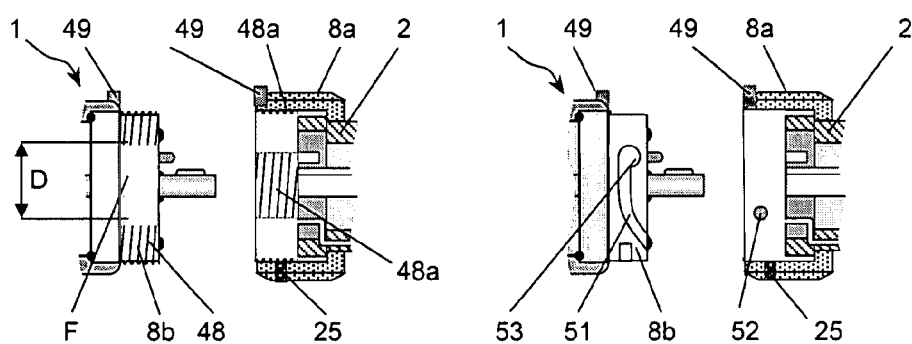
Fig 9                    Fig 10

COUPLEABLE DRIVE

TECHNICAL FIELD

The invention is based on a water- and particle-proof electric working means that is equipped with a basic drive, which can be coupled to various technical modules via a lockable quick-acting closure by means of few manual actions in order to thus be able to utilize the working means according to the preamble of the first claim additionally as a lifting, swinging or turning medium.

PRIOR ART

Due to various stroke length requirements and thrust forces, as well as technical equipment and the corresponding IP protection classes, specifically developed cylinders or swinging or turning means are known in the marketplace as closed system units; consequently, there results an innumerous quantity of item numbers and related stock-keeping complexities involving cylinders, swinging and turning means, respectively, frequently only semi-finished products that still require manufacture and assembly for compliance with the tasks at hand.

DESCRIPTION OF THE INVENTION

The underlying object of the present invention is to design a multifunctional type of cylinder that can be adapted according to the desired tasks by the end user and according to said end user's requirements by means of few manual actions right on site and by means of a lockable quick-acting closure, thereby allowing for more functions than just traversing a stroke, namely also allowing for use as a swinging and turning means. Corresponding modules can be identical across products, thereby saving costs and reducing stock-keeping complexities. Simultaneously, the cylinder is in the basic form thereof already configured for a high level of IP protection, with the cables having pre-customized lengths and attached to which are simple connectors that also include locking and water-proof, quick-acting closures. According to the invention, an electric motor and a transmission, which are the basic means, are packed in a water-proof manner in order to mount thereto a water-proof power and sensor plug, an air guide and a coupling to which various technical means in different configurations can be exactly fitted as well as securely fastened and powered. The base constitutes a drive body that provides thus, by means of a quick-acting closure, various spindle lengths with corresponding strokes that are available as plug-on modules; whereby there is represented a matched lift cylinder, such that the user is able to couple a certain stroke length by means of few manual actions to a correspondingly powerful drive. The complete construct is expandable in that the user is able, applying simple manipulations, to insert at the provided recesses in the coupleable modules, for example, a lifting sensor or force sensor or an intermediate module, such that two drives power one piston rod, or the module executes a turning motion instead of a lifting motion, or such other means can be inserted there between, such as, for example, a bevel gear system, locking means and other components, and which can be held flush by means of the quick-acting closure, also twist-proof and leak-proof.

By means of the corresponding seal and seal mounting on the basic housing, which receives the electric motor and the connections, it is ensured that the individual electric components are packed in a water-proof manner and, even in the most unfavorable case scenario, should the modules coupled thereto leak and the cylinder therein is immersed in water, this would still not cause a device failure.

Using a quiver-type receptacle that is mounted on the drive body, serving as a container for gas springs—pressure or tension springs—it is thus possible to generate a greater force in the context of a given drive in an easy manner, either for lifting a load or pulling a load upward. Blockable gas springs can also be placed inside the container, such that a drive of this kind can be blocked in an extremely efficient manner, while the corresponding safety of a selected and maintained lifting position can be ensured.

According to the invention, this object is achieved by the characteristics as set forth in of the first claim.

The core aspect of the present invention is a high-value basic drive with a high level protection class having different technical modules as function carriers that are completed for use in a secure, accurately fitted manner by means of a few manual actions and able to produce additional output in conjunction with further modules that can be connected thereto.

Further advantageous embodied example of the invention can be derived from the dependent claims.

DESCRIPTION OF THE DRAWINGS

Embodiments of the present invention shall be illustrated in further detail based on the drawings below. Same elements in different figures therein are identified by identical reference signs.

Shown are as follows:

FIG. 5 is a schematic side view of a reversing gear and coupling means relative to the basic drive body, as well as a connection to a further module and a separate mounting eye;

FIG. 6 is a schematic side view of a turning drive for receiving a rocking lever or a roller and coupling means relative to the basic drive body;

FIG. 7 is a schematic side view of a basic drive body with a solar cell envelope connected to a condenser, an accumulator as well as a concave mirror and a remote control;

FIG. 8 is a schematic side view of a sensor module with the distance measurement sensor and sensor, contacting;

FIG. 9 is a schematic side view of a quick-acting closure by means of an interrupted thread on the basic drive and on the coupleable module;

FIG. 10 is a schematic side view of a quick-acting closure by means of a bayonet lock on the basic drive and on the coupleable module;

For an immediate understanding of the invention, essential elements are only shown by way of a schematic representation.

WAYS OF EMBODYING THE INVENTION

Figure 1:
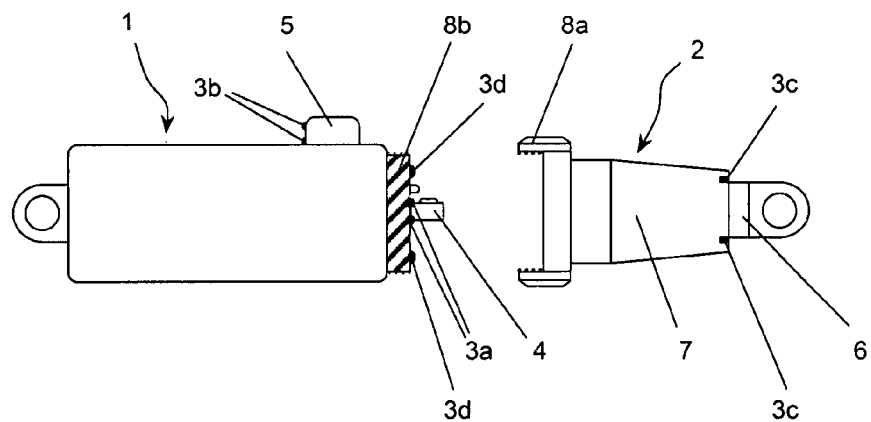
FIG. 1 is a schematic side view of a basic drive body with the sealing locations, coupling means and a coupleable, sealable module.

FIG. 1 shows a schematic side view of a modular basic drive 1, which constitutes a basic cylinder body, and a module 2, wherein the basic drive 1 is sealed around the complete circumference thereof against the penetration of water or air particles by means of a corresponding seal 3a on the drive shaft 4 and seal 3b at the cable insertion site 5. Located on module 2, presently shown in the version of a lifting spindle, there is a seal 3c between the piston rod 6 and guide housing 7, and a further seal 3d is located between basic drive 1 and module 2. The basic drive 1 is connected to module 2 by means of the quick-acting closure 8a, b, thereby constituting a functional device.

Electric cylinders have a wide spectrum of uses, which means a multitude of different stroke lengths and thrust forces as well as lifting speeds are required in the marketplace. Furthermore, in certain areas of application, perhaps only a simple lifting mechanism is needed, while for other applications, in turn, a distance measurement, a brake or a locking mechanism in the lift position is required. This results in complexity when providing electric cylinders, wherein a great part of such lifting processes have identical strokes, while others, in turn, have an identical output requirement, such that it makes sense to envision a modular setup and thereby serving a great share of the market with standardized technical modules, ranging all the way to the hobby market where the basic drive 1 and many further modules 2 can be made of fiberglass-reinforced plastic materials. The central aspect is easy handling and assembly of a device of this kind, as well as a high level of sealing protection in order to be able to use the device in an identical manner in outside and inside applications. Also, a divergent requirement can possibly emerge in the context of an application; due to the modularity of the device, such task requirements can be professionally resolved with only a few manual actions; for example, coupling a module to two motors and forwarding thereby quasi double the power to the spindle lift, or a module that allows for a swinging motion or executes a turning motion thereby powering a roller or a sprocket.

Figure 2:
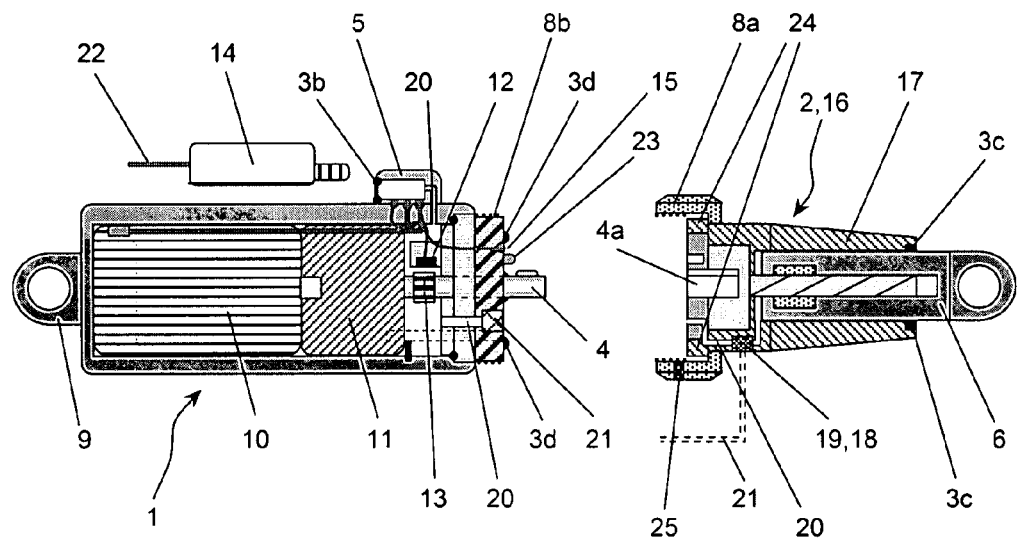
FIG. 2 is a schematic side view of a basic drive body with the motor and transmission positions, the coupling means, the integrated sensor and the cable guide, as well as water-proof, electric contacts, a controller that can be inserted in the cable connection, as well as a spindle drive with air pressure compensation and coupling means relative to the basic drive body.

FIG. 2 shows a schematic side view of a modular basic drive 1 that constitutes a basic cylinder body with the mounting eye 9, the assembly layer of the motor 10 and of the transmission 11, a distance measurement sensor 12, which is integrated in the basic drive 1, in form of a Hall generator or induction-type pulse generator with the distance sensor 13, which measures the number of revolutions on the output shaft 4, for example, and the signal is forwarded for processing to the controller 14 by means of the cable insertion site 5, or the distance measurement sensor 12 is present as cable control generator, which is then connected to the piston rod 6 that is located in module 2. The distance measurement sensor 12 is normally inserted into a corresponding contact site and held therein or integrated together with the distance sensor 13 in module 2, wherein, in this instance, an outside-lying contact site 15 is mounted on the basic drive 1, such that, when combining the basic drive 1 and the spindle lift module 16, the distance measurement sensor 12 is contacted. FIG. 8 shows a representation of the variant of a distance measurement sensor 12 and distance sensor 13 as a sensor module that is clamped there-between. Simultaneously, when combining the basic drive 1 and the spindle lift module 16, the seal 3d is activated, such that the totality of the inside of the module 2, presently represented as a spindle lift module 16, with the wave sensor 4a, spindle drive 17 and piston rod 6, whereupon seal 3c is mounted, is sealed against outside influences. A seal of this kind only works flawlessly if the inside of the spindle lift module 16 is simultaneously maintained pressureless. This is achieved by providing an opening 18 in the spindle lift module 16 that has attached thereto a hydrophobic filter 19 or a channel 20 that filters the varying air pressures occurring when the piston rod 6 enters and exits the basic drive 1 by means of channel 20, that is continued until the outlet at the cable insertion site 5 where an air hose is mounted, which is presently not shown, thus being directed, for example, above the water line or into a dust-free zone. At the end of the air hose, there can also be located a filter 19 or a bellows in order to ensure that no water or dirt particles can enter the air hose. Said hose also ensures that the temperature of the motor 10 and transmission 11 can be carried off. A filter 19 can also be located on the basic drive 1 to ensure that, should a module 2 suffer a leak, no water or dirt particles, which can cause damage to the transmission 11 or the motor 10, can penetrate to the inside even at that location. Conceivably, a hose 21 can be mounted on the spindle lift module 16 at filter 19 that serves as a snorkel, thus causing the pressure equalization on the inside of the spindle lift module 16, wherein pressure differences from temperature fluctuation are also equalized.

The cable insertion site 5 can be a detachable connection according to the known class of water-proof plugs; similarly, at the same location, it is possible to intermediately insert and mount a correspondingly sealed controller 14, and route the power line 22 at the power source.

A central element of the invention provides for coupling basic drive 1 with module 2 in that the parts are supplied, in a centered manner and the opposing front sides thereof being flush, by means of a guide, which is presently not shown, and whereby the seal 3d is compressed in a conforming manner, in that the torsion-proofing pin 23 prevents any twisting of the module 2 and simultaneously aligns the basic drive 1 and the module 2 relative to each other, also taking into account the contact location 15.

The quick-acting closure 8a,8b consists of a coupling nut 8a that is tightened on the shoulder 24 of the spindle lift module 16 constituting either a quick-acting closure, as in FIG. 8, or a bayonet lock, as in FIG. 9, such that by a quarter turn in the receiving profile 8b of the basic drive 1, for example, the spindle lift module 16 is thus coupled in a manner that is twist-proof and water-proof, and wherein it can be additionally secured by means of the security screw 25 to safely protect against strong vibrations or the like, ranging all the way to protection against an inadvertent detachment of the coupling.

Figure 3:
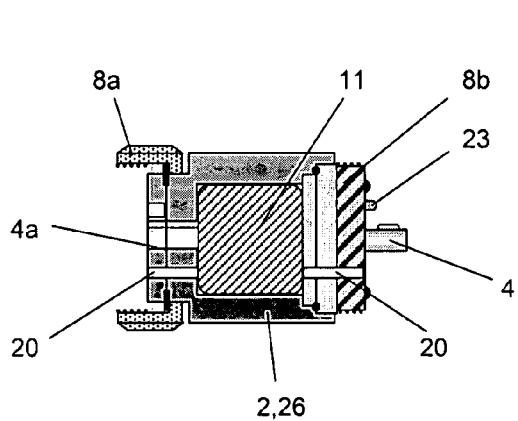
FIG. 3 is a schematic side view of a reduction gear and coupling means relative to the basic drive body, as well as connection to a further module.

FIG. 3 shows a schematic side view of a reduction gear 26 that includes the coupling nut 8a on one side and the receiving profile 8b of the quick-acting closure 8a,8b on the opposite side. This module constitutes an intermediate element for changing on a drive the reduction gear condition by means of an additional transmission 11, wherein the torsion-proofing pin 23 and the channel 20 are integrated therein.

Figure 4:
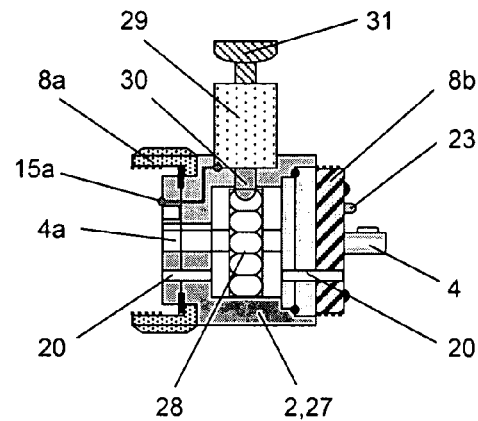
FIG. 4 is a schematic side view of an electromechanical locking means having an emergency lock and coupling means relative to the basic drive body, as well as a connection to a further module.

FIG. 4 shows a schematic side view of an electromechanical locking mechanism 27 that includes on one side the coupling nut 8a and the receiving profile 8b of the quick-acting closure 8a,8b on the opposite side. The module includes a locking wheel 28 between the wave receptacle 4a and wave outlet 4 that is locked by means of a locking pin 30, which is integrated in the lifting magnet 29, triggered by a current impulse that reaches to the contact stop 15a by means of a current connection. If the electric locking mechanism fails, a manual emergency lock 31 is mounted on the lifting magnet 29. This module allows, for example, not only for holding a spindle lift module in a desired position but also for locking said position. Such a current impulse is advantageously triggered by the controller 14; in simple applications, it can be triggered by a time function and by a switch-on or switch-off, respectively, of the motor 10. The locking wheel 28 can be operated radially as well as axially by a lifting magnet 29 with locking pin 30 and can also contain a ratchet-and-pawl mechanism, such that the locking action occurs only in one direction.

FIG. 5 shows a schematic side view of a redirection 32 that includes on the one side the coupling nut 8a, presently clamped instead of against the shoulder 24 against the snap ring 24a, and on the opposite side the receiving profile 8b of the quick-acting closure 8a,8b. The module allows for fixing the motor 10 in place in a parallel fashion, for example, relative to the spindle lift module 16, such that a shortening of the overall system is achieved and the thrust or tension forces, respectively, are applied, on the one hand, to the mounting eye 9 at the piston rod 6 and, on the other hand, in the same plane relative to the mounting eye 9 at the redirection 32. Torque M is forwarded by means of the gear set 33 and connecting gear 34 to the output shaft 4 as torque M1. In this configuration, the module is divided in two parts including an upper part 35a and a lower part 35b and supported and held by means of the turntable 36, such that not only the force can be routed parallel from one plane to the next plane, but that the basic drive 1 can stand twisted abeam relative to the spindle lift module 16 for example by 90°, and the module is fixed in place by means of the angular lock 37. Presently not shown are the corresponding bearing elements and sealing means. If only a redirection of force is desired, the module is in one piece and the two gear sets 33 are able to mesh directly.

FIG. 6 shows a schematic side view of a turning module 38 that includes on one side the coupling nut 8a and on the opposite side the receiving profile 8b of the quick-acting closure 8a,8b. The turning module 38 has a receptacle 39, whereby it is possible to mount a rocking lever 40 or a roller 41 and the like to the same. In particular in connection with the distance measurement sensor 12, it is possible to passage a certain angular path, being brought to a halt by the controller 14 at the desired location, then moved in the opposite direction; or a roller 41 or sprocket is to rotate at a certain speed; in fact, the combinations with the modules and controller 14 that is harmonized thereto are plenty.

FIG. 7 shows a schematic side view of a modular basic drive 1 and the module 2, which is presently represented as spindle lifting module 16 having a stroke H according to the arrow and a solar cell envelope 42 that is placed on the two modules and connected to a condenser 43 or an accumulator 44, as well as a concave mirror 45 and a remote control 46.

A coupleable cylinder of this kind is ideally suited, for example, for environments that are difficult to access, such as, for example for opening and closing access traps, and in places where the routing of electrical lines is expensive or optically unacceptable. A lift cylinder is autonomous in that the power for the control that opens and closes a means is generated via the solar module. To avoid using a large panel, particularly when the solar means is a window that is to introduce as much light as possible to the inside, the solar module is configured as a cylinder; and the side that is directed away from the light receives the light by means of the concave mirror 45, which reflects the light incidence L according to arrow L on the shadow side of the solar cell envelope 42. The concave mirror 45 can include prisms or the like, such that the light is optimally reflected back to the solar cell envelope 42 with each light incidence. The energy that is generated in the solar modules is either forwarded to a condenser 43, which is able to store the power over the short term, and to the accumulator 44 when a larger-scale power storage task is required. The energy is needed for the actuation of the motor 10 in the basic drive 1 and possibly for unlocking the lifting lock or/and for the sensors 47, such as, for example, the distance measurement sensor or rain sensor and the like, as well as for the sending/receiving operation of the remote control 46, such that, via radio or light waves, the cylinder can be triggered manually or automatically, interacting with a plurality of other cylinders that are mounted in an exemplary manner on light access traps, for example, in order to introduce more air into the room or, to the contrary, to close the light access traps during rain or cold. A current relay W coordinates the current flow and can be a part of a higher-level networking of different actors.

FIG. 8 shows a schematic side view of a sensor module 54 with a distance measurement sensor 12 and a distance sensor 13 as well as contact stop 15a. The sensor module 54 can be positioned in the manner of a sandwich between the basic drive and one of the modules 2, centered by means of the torsion-proofing pin 23 and the guide elements that are presently not shown, as well as by means of the seal 3d and seal 3e, which are configured as an O-rings, and the electronic components as well as the contact stop 15a are located inside the O-rings. Needed to this end is an elongated coupling nut 8a, which is presently not shown, that is also suitable for use in connection with other "sandwich" modules for the purpose of coupling a module 2 to the basic drive 1.

FIG. 9 shows a schematic side view of a quick-acting closure 8a,8b with an interrupted thread 48 having an interruption distance D on the basic drive 1 and on the coupleable module 2 and markings 49.

Although a coupling nut 8a with a normal thread would also provide coupling action between a basic drive 1 and module 2, the marketplace nevertheless desires achieving any combining of parts with as little manual effort in as little time as possible, while still, however, having the security screw 25 as an additional safety element [pressing] against the flattened part F that interrupts the thread 48, and whereby the security screw therefore does not press in the thread 48. Corresponding to the interruption distance D, there is incorporated in the coupling nut 8a a partial thread 48a that is almost as wide as the former, such that the same fits into the gap of the interruption distance D and can be pushed into the same, such that the coupling nut 8a located as closely as possible relative to the receptacle profile 8b on the basic drive 1, thereby rendering it possible to elegantly couple the basic drive 1 to the module 2 by means of a quarter turn on the coupling nut 8a, for example. Markings 49 on both parts of the quick-acting closure 8a,8b point the way at which location the insertion is to occur and also indicate as to whether the coupling nut 8a was turned. The coupling nut 8a can have different lengths, such that it is possible to connect and hold one or a plurality of modules 2 by means of such a nut.

FIG. 10 shows a schematic side view of a quick-acting closure 8a, 8b with a bayonet lock having a bayonet guide 51 on the basic drive 1 and bayonet cams 52 on the coupleable module 2, as well as markings 49.

The bayonet lock is the ideal coupling for the described elements because there is no over-twisting of the coupling nut 8*a*, and, by means of a recess in the bayonet guide, any snapping into place during the closure process can be felt and heard in that the rubber of the seal 3*d* is compressed and quasi springs back from the stop, whereby it confirms with certainty that the bayonet lock has snapped into place. Simultaneously, the location where the security screw 25 meets the receptacle profile 8*b* is precisely defined. For the overall element to work, the coupling nut 8*a* must contain a corresponding bayonet cam 52 that engages in the bayonet guide 51, thereby allowing for the closure process. It makes sense to equip the bayonet lock with at least two bayonet guides 51 and bayonet cams 52 in order to allow for an even tension in the closure. The coupling nut 8*a* can have various lengths, such that it is possible to connect and hold a single of a plurality of modules 2 with a nut of this kind.

Figure 11:
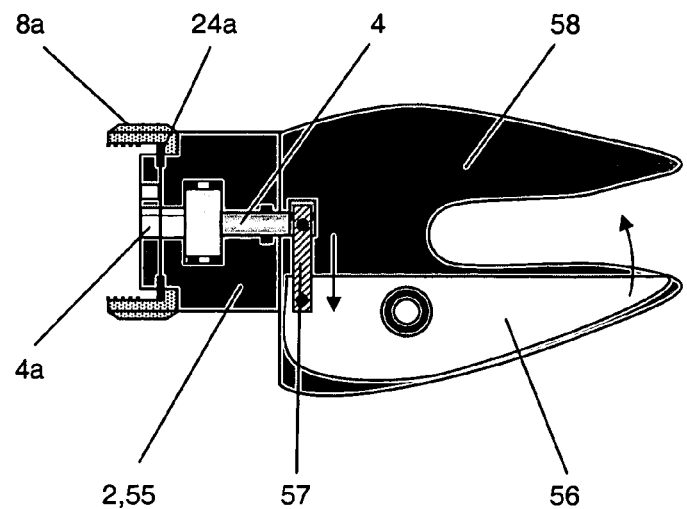
FIG. 11 is a schematic side view of a coupleable module in form of a hedge clippers with a movable blade.

FIG. 11 shows as schematic side view of a coupleable module 2 in form of a hedge clippers 55 with a movable blade 56. The solution as shown in FIG. 6 for the turning motion can also be utilized for a hedge clipper blade or for a locking clamp, wherein a controller 14 and a distance measurement sensor 12 must also be packed therein, such that the drive shaft 4 [sic] only executes a limited swing motion after which it swings back to the basic position. For the cutting or clamping motion, a rocking lever is required 40, which actuates, for example, a gimbally-rotationally supported slide 57 and is mounted on the opposite side on the blade 56, which itself is rotationally supported on the cutting plate 58 and is therefore able to swing for the purpose of executing the cutting action. A conceivable solution provides for a small spindle on the output shaft 4 that actuates a conical pressing means that guides the blade 56 to the swing function.

Figure 12:
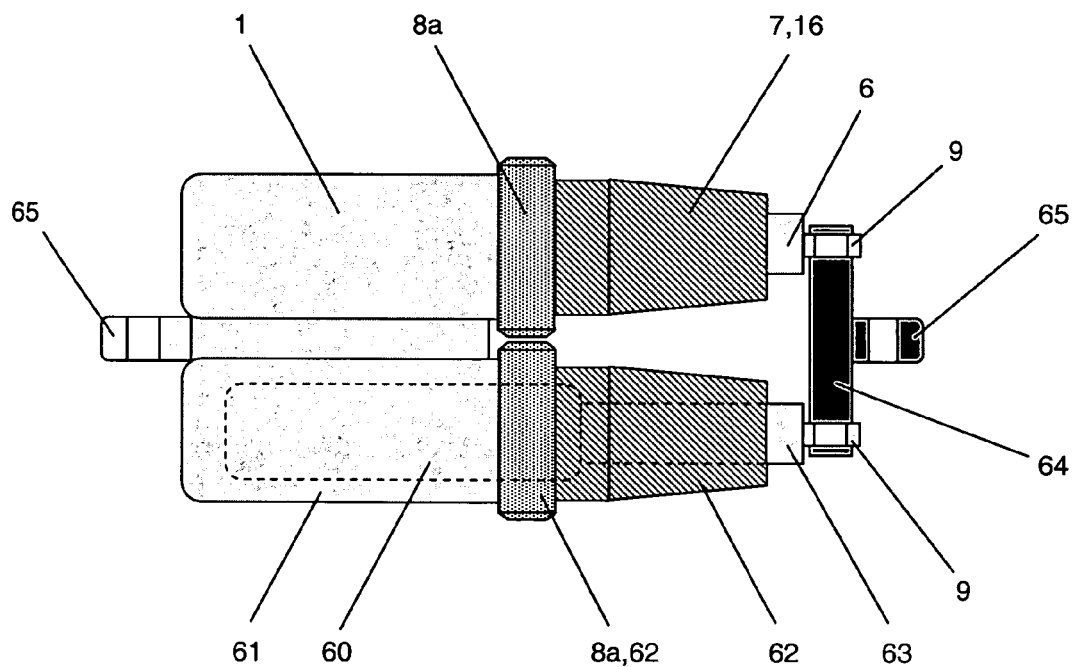
FIG. 12. is a schematic top view of a double module with a basic spindle drive and a gas spring recessed adjacent thereto.

FIG. 12. shows a schematic top view of a double carrier 59 that receives the basic drive 1 and has, furthermore, an integrated gas spring 60.

In most applications of such coupleable drives, the same fulfills a one-sided task, namely lifting a load or moving a load in a lateral direction. For the return to the starting position, only a small amount of force is required if horizontal movements are involved, mostly only enough to overcome friction, no force is theoretically required for vertical motions because gravity provides all that is necessary; however, in most cases, a deceleration force for a smooth return to the starting position is needed. To lift a certain weight over a preset amount of time, the motor therein is therefore correspondingly aligned with the transmission and the spindle, wherein small systems, for example, operated at 12/24 V do not transmit high torques, whereby the lifting power at 1000 N at 1 cm/sec and self-locking spindle already means a good performance. For example, if a lifting power is desired that is, for example, 60% higher and with the same lifting speed, such a spindle drive is substantially larger in terms of the construction thereof and includes a completely different arrangement of motor, transmission and spindle configuration.

With a double carrier 59, which contains, on the one hand, the totality of the basic drive 1 and laterally thereto, on the other hand, a quiver-type container 61 in which the gas spring 60 can be placed, it is possible to almost double the lifting force. The gas spring, for example a gas pressure spring, thereby supports the lifting operation better than any conventional-type spring that has a steep spring progression, while gas springs, on the other hand, have a flat spring progression. Thereby, gas spring 60 relieves the pressure on the motor 10, transmission 11 and spindle drive 17 during the lifting action; in return, the above-named components must perform work during the return motion to the starting position which ultimately has an overall positive effect because the system must not be decelerated and is able to lift substantially greater loads. Furthermore, the gas spring 60 can be equipped with a locking device, which is presently not shown, that allows for safely maintaining an adjusted lift; and it is possible, in most cases, to forego the self-locking spindle with massive power consumption, thereby allowing correspondingly for the selection of an even smaller motor 10 and transmission 11. It is understood that the use of a gas tension spring is, instead of lifting, also possible for the purpose of pulling a load upward.

The gas spring 60 is thus inserted in the container 61 and securely held therein by means of spring cover 62. For the entire element to work, it is necessary for the piston rod 6 of the spindle lift module 16 to be fixedly connected to the gas spring piston rod 63 by means of the synchronization linkage 64. A central mounting eye 65 is centrally mounted on the same. Such a central mounting eye 65 is also located at the end of the double carrier 59.

The totally circumferentially sealed basic drive 1 allows for conceiving innumerous further connections to modules 2, which are torsion-proof, quickly changeable and easy to retrofit, such as, for example, a module that houses two motors guiding the same to an output shaft 4 or a telescoping lift spindle, ranging to modules that represent a lawn mower or a lawn trimmer, such that a basic drive 1, which includes a power-sensitive motor 10 and transmission, can be used also to meet the requirements posed by other tasks in the industrial, do-it-yourself or gardening sectors.

It is understood that the invention is not limited to the presently shown and described embodiments.

The invention claimed is:

1. A basic drive with a coupleable module, comprising:
    a motor,
    transmission connectable to the motor,
    a receiving profile,
    a cable insertion site, and
    an output shaft connected to the transmission, wherein:
        the output shaft and the cable insertion site are sealed so as to be water and particle proof,
        the basic drive is coupleable with the coupleable module via a quick-acting closure, in a manner that is flush, centered and torsion-proof, and
        at least one of the following:
            a first seal located between the basic drive and the quick-acting closure,
            at least one filter with a channel mounted on the basic drive,
            a contact location, or
            a second seal, a filter, a channel and a coupling nut of the quick-acting closure mounted on a spindle lift module on a piston rod.

2. The basic drive with the coupleable module according to claim 1, wherein
    a distance sensor with a distance measurement sensor and a contact stop are located between the basic drive and the coupleable module.

3. The basic drive with the coupleable module according to claim 1, wherein
    a torsion-proofing pin is located on the basic drive, and the coupling nut includes a security screw.

4. The basic drive with the coupleable module according to claim 1, wheiein
the quick-acting closure includes a receiving profile and the coupling nut, and
the quick acting closure includes:
at least two flattened parts located at the receiving profile, and partial threads located on the coupling nut, or
a bayonet guide mounted on the receiving profile, and a bayonet cam mounted on the coupling nut.

5. The basic drive with the coupleable module according to claim 1, wherein
the quick-acting closure includes a receiving profile and a coupling nut, and
the receiving profile and the coupling nut are able to glide into each other and are able to turn by less than a full rotation in order to couple and seal the basic drive and the coupleable module.

6. The basic drive with the coupleable module according to claim 1, wherein
the coupleable module comprises at least one of the transmission or the channel.

7. The basic drive with the coupleable module according to claim 1, wherein
the coupleable module includes a locking wheel, a lifting magnet, a locking pin, a contact stop and an emergency lock.

8. The basic drive with the coupleable module according to claim 1, wherein
the coupleable module includes a receptacle for two basic drives with one drive on the output shaft.

9. The basic drive with the coupleable module according to claim 1, wherein
the coupleable module includes at least one of a gear set for redirecting torque or a connecting gear with an upper part, a lower part, a turntable, an angular lock and a mounting eye.

10. The basic drive with the coupleable module according to claim 1, wherein
the coupleable module includes a receptacle in order to receive a roller or a rocket lever.

11. The basic drive with the coupleable module according to claim 1, wherein
a housing of the basic drive and a housing of the coupleable module are manufactured completely of plastic.

12. The basic drive with the coupleable module according to claim 1, wherein
at least one of a solar cell envelope is mounted around the basic drive and the spindle lift module or a concave mirror is mounted,
the solar cell envelope is connected to at least one of a condenser or an accumulator, and
a remote control or sensors are connected to a current relay.

13. The basic drive with the coupleable module according to claim 1, wherein
a controller can be plugged in at the cable insertion site in a water-proof manner.

14. The basic drive with the coupleable module according to claim 1, wherein
a hose with a filter or a bellows is mounted at the cable insertion site or spindle lift module.

15. The basic drive with the coupleable module according to claim 1, wherein
the basic drive is in a double carrier with a container, and
a gas spring is integrated in the container that can be a compression spring or tension spring.

* * * * *